E. BERTHOLD.
COOKING UTENSIL.
APPLICATION FILED JAN. 8, 1912.

1,047,608.

Patented Dec. 17, 1912.

WITNESSES:

INVENTOR
Emil Berthold
By Robt. Klotz
ATTORNEY

UNITED STATES PATENT OFFICE.

EMIL BERTHOLD, OF CHICAGO, ILLINOIS.

COOKING UTENSIL.

1,047,608.   Specification of Letters Patent.   Patented Dec. 17, 1912.

Application filed January 8, 1912. Serial No. 669,933.

*To all whom it may concern:*

Be it known that I, EMIL BERTHOLD, a citizen of the United States, residing at Chicago, Illinois, have invented a certain new and useful Cooking Utensil, of which the following is a specification.

The essential object of the invention is to provide a utensil adapted to be used in cooking any articles which must either be submerged in or retained at a fixed height above the level of a very hot liquid contained in a kettle or caldron, or articles which it is desired to cook first on one side and on the other. One use to which the invention has successfully been applied is the manufacture of doughnuts, and, by the use of the invention forming the subject-matter hereof, the utensil containing the uncooked doughnuts can first be lowered to a point where the lower half of each doughnut is submerged in the lard, the upper half remaining above the level of the liquid, after which the container can be inverted and the other side of the doughnut cooked. After being cooked, the doughnuts can be raised out of the liquid, and the doughnuts permitted to drain into the same caldron in which they were cooked. In this manner loss of lard is prevented, and yet the cook obviates the necessity of providing separate utensils for the cooking and for the draining. Many other possible uses of this invention will readily occur to experienced cooks and bakers.

Figure 1:
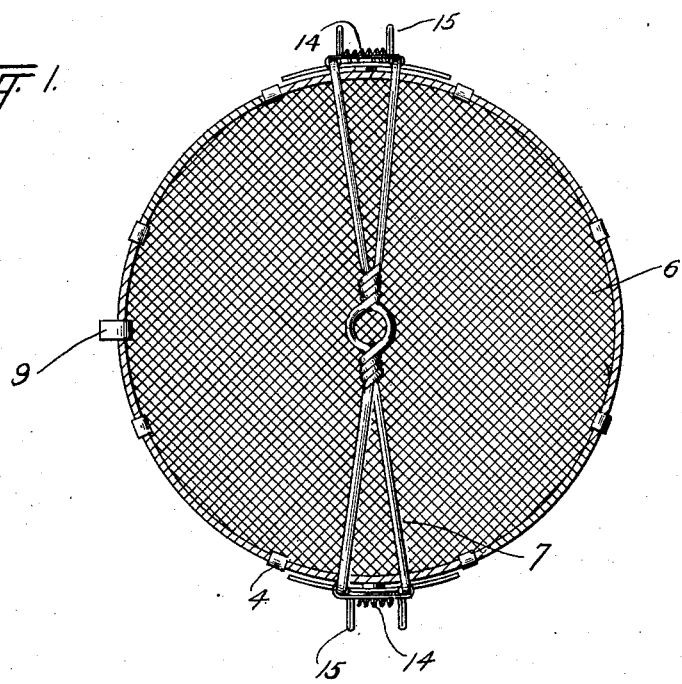
Figure 2:
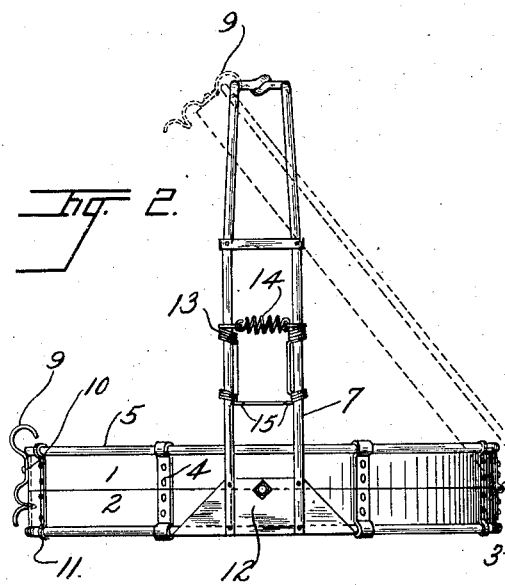

In the drawings, Figure 1 is a top plan view of the utensil; Fig. 2 is a side elevation, and Fig. 3 is a fragmentary view showing the container in a different position from that indicated in Fig. 2.

The utensil is made of any desired size and shape, but is preferably round, as shown in the drawings. The main body or container is formed of two annular side-pieces or members 1 and 2, preferably of sheet metal, which are hinged together at 3. Reinforcements 4 will prevent bending of the sides 1 and 2, as well as hold the top and bottom to the sides. The exposed edges 5 of the sides 1 and 2 are bent backward so that no sharp edges are presented.

To each side-member 1 and 2 a wire mesh 6 is secured, or a foraminous disk (not shown) or any other perforated member may be substituted for said wire mesh. The mesh-like member secured to side 1 is thus the top of the utensil, while the mesh secured to member 2 is the bottom, and the sides 1 and 2, together with the top and bottom, comprise the container for other articles to be cooked.

Figure 3:
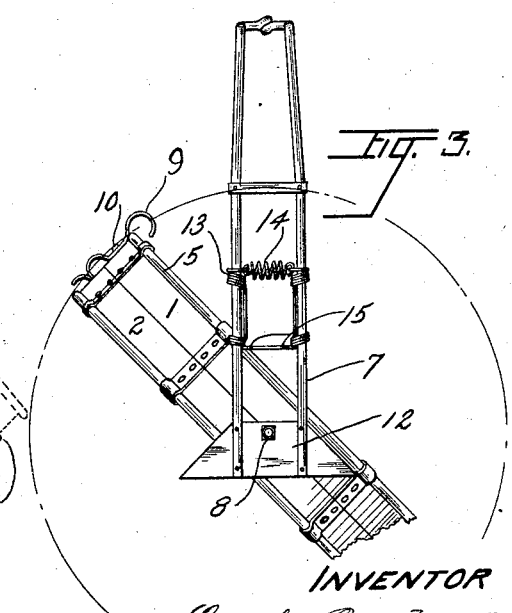

The bail 7 is pivoted at 8 to side 2, and the container can be rotated completely around 1 as shown in Fig. 3, turning upon said pivots 8 as on axis. To side 1 the spring-like clamp and hook 9 is riveted or otherwise fastened at 10. One end of said member 9 is adapted to sink into a recess 11 in side 2, and thus lock the top and bottom together, as shown in full lines Fig. 2, but when the top is lifted, as shown in dotted lines in said Fig. 8, said member 9 hooks the top to the bail 7 and keeps same out of the way of the cook when the doughnuts or similar articles are being handled. The bail 7 carries braces 12, the object of said members 12 being to keep the bail elevated when the utensil is set upon the floor or table, and thus prevent said bail from falling.

The most important feature of the invention, however, is the fact that the utensil is provided with stirrups 13, which said stirrups can be adjusted at any desired point upon the bail 7, and in this manner the cook can regulate at will the height of the container within the caldron in connection with which same is being used. The stirrup 13 preferably comprises a strong wire which is wrapped several times around each arm of the bail 7, the ends of said wire being cross-connected by a spring 14. The stirrup is formed with an outwardly projecting foot or feet 15, which are adapted to rest upon the edge or mouth of the caldron. The stirrup is so made that it will slide upon bail 7, but not readily so, and is held so tightly upon the bail that considerable effort is required to move it upwardly or downwardly, and so that when the stirrups are once moved to the points where the cook wishes, the mere weight of the container and its contents will not suffice to cause the stirrups to slide.

The operation will be evident from the foregoing detailed description of parts, but may be summarized as follows: The doughnuts are placed within the container, and the top 1 locked in place by clamp 9. The stirrups are then adjusted as desired, and the whole utensil and its contents placed within the caldron. The projecting feet rest upon the sides of the caldron, and thus the container can be held at any desired height within the caldron. The bail 7 and stirrups 13 need not be of the same size and shape shown in the drawings, but may be replaced by any other members or parts which provide an outwardly projecting foot or stirrup adjustable at any desired height above the container. That part of the bail which comes in contact with the stirrup is preferably composed of two separate wires or rods, and the stirrup is twined or twisted about each rod of the bail.

As shown in the drawings, the bail 7 is preferably made of wire and is provided with two substantially parallel arms or parts. Wire is used because it is desirable to have the bailing formed of a cylindrical body of uniform diameter. The stirrup 13 is provided with a loop or loops which encircle each arm of the bail 7 and are wrapped around the arms of the bail so that the arms of the bail are slidable within the loops of the stirrup. The spring 14 is located in the space between the two arms of the bail and cross connects the ends of the wire out of which the stirrup is formed. The lower ends of each arm of the bail are riveted or otherwise firmly secured to braces 12. At a distance above the pivot 8 a cross-arm or rigid brace is provided and fastened to each arm of the bail. These cross-arms and the braces 12 being rigid members, keep the two arms of the bail spaced apart from each other, and, since the spring 14 is located in the space between the two arms of the bail, the spring will pull the two ends of the stirrup together and will cause the loops encircling the bail immediately adjacent to the ends of the stirrup, to be clamped tightly upon the bail, the two arms of which are kept spaced apart a predetermined distance by the unyielding braces or cross-arms aforesaid. The spring 14, therefore, by drawing the two ends of the stirrup together, produces such a great degree of friction between the loops of the stirrup and the arms of the bail, which said loops respectively encircle, that the stirrup is not readily slidable upon the bail, and the stirrup will be clamped so tightly upon the bail that the mere weight of the container and its contents cannot cause the arms of the bail to slide within the stirrup when the outwardly projecting feet 15 of the stirrup rest upon the caldron.

The container is first lowered to a point where the doughnuts are about half submerged in the lard, and thereafter is inverted so that the other half of each is submerged.

I claim as my invention:

1. A utensil comprising a container, a bail attached thereto, said bail comprising a pair of arms and means to space said arms apart from each other, a stirrup which encircles each of said arms and which is slidable with respect thereto, and a foot which projects outwardly from said stirrup and which is adapted to rest upon any suitable support.

2. A utensil comprising a container, a bail attached thereto, said bail comprising a pair of members and means to hold same apart a predetermined distance, a stirrup which is wrapped around and encircles each of the members comprising said bail, a spring connected to the ends of said stirrup and adapted to pull same together, said spring being disposed in the space between the two parts of said bail, and an outwardly-projecting foot carried by said stirrup and adapted to rest upon any suitable support.

3. A utensil comprising a container, a bail attached thereto, said bail comprising a pair of substantially parallel arms, rigid means for keeping said arms spaced apart from each other, a member which is wrapped around one of said arms and which encircles said arm, resilient means connecting the said encircling member to the other arm of said bail, said resilient means being adapted to produce friction between the arm of the bail and the member which encircles the same, and an outwardly-projecting foot carried upon the member which encircles said bail, said foot being adapted to rest upon any suitable support.

4. A utensil comprising a container, a bail attached thereto, said bail having a pair of arms and means secured thereto, said means being adapted to space said arms apart from each other, a member which encircles and which is slidably mounted upon one of said arms, said member being provided with an outwardly-projecting foot adapted to rest upon any suitable support, and means connecting said member to the opposite arm of said bail and adapted to produce frictional contact between said first-mentioned bail-arm and the member which engages same.

5. A utensil comprising a container, a bail attached thereto, a pivot connecting said container to each arm of said bail adjacent to the bottom thereof, said container being revoluble upon said pivots, an outwardly-projecting foot secured on each arm of said bail above each of said pivots, said feet being adapted to rest upon any suitable support, and means for clamping said feet at any desired height upon said bail.

In testimony whereof I have hereunto set my hand in the presence of two witnesses.

EMIL BERTHOLD.

Witnesses:
GEO. A. SHAFER,
ROBT. KLOTZ.